United States Patent [19]

Horst et al.

[11] Patent Number: 5,016,208

[45] Date of Patent: May 14, 1991

[54] DEFERRED COMPARISON MULTIPLIER CHECKER

[75] Inventors: Robert W. Horst, Champaign, Ill.; Robert L. Jardine, Cupertino, Calif.

[73] Assignee: Tandem Computers Incorporated, Cupertino, Calif.

[21] Appl. No.: 377,982

[22] Filed: Jul. 11, 1989

[51] Int. Cl.⁵ .............................................. G06F 11/14
[52] U.S. Cl. ..................................................... 364/740
[58] Field of Search ......................................... 364/740

[56] References Cited

U.S. PATENT DOCUMENTS 3,660,646  5/1972  Mirero et al. ................... 364/740
3,846,626  11/1974  Yoshida ............................ 364/740
4,314,350  2/1982  Toy ................................... 364/740

OTHER PUBLICATIONS

*Progress Report #2 on the EDVAC* Jun. 30, 1946, pp. 1-4-6 and 1-4-7.
Anello et al., "Error Checking by Pseudoduplication", *IBM Tech. Disclosure Bulletin*, vol. 14, No. 1, Jun. 1971, pp. 16-17.
"Concurrent Error Detection in Multiply and Divide Arrays", Janak H. Patel and Leona Y. Fung, IEEE Transactions on Computers, vol. C-32, No. 4, Apr., 1983 (pp. 417-422).

*Primary Examiner*—David H. Malzahn
*Attorney, Agent, or Firm*—Townsend and Townsend

[57] ABSTRACT

In a data processing system, a multiplication operation is immediately followed by a redundant multiplication operation, using the same, albeit altered, operands, to check the initial result. The initial result is immediately available for use, but the check is not performed until some time later. The original operands are altered for the redundant multiplication operation by shifting one operand 1 bit, and swapping them before multiplication.

8 Claims, 3 Drawing Sheets

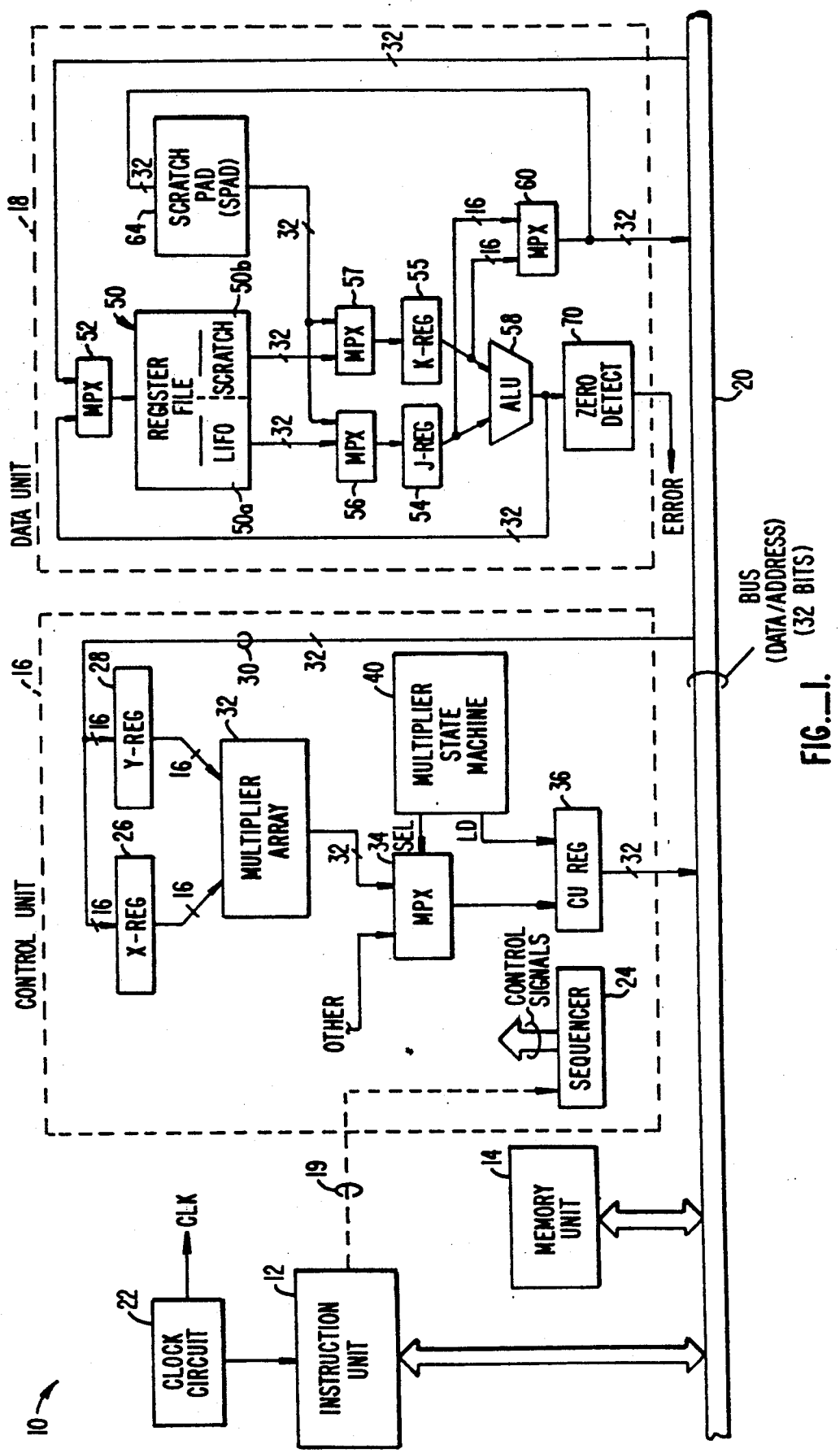
FIG._1.

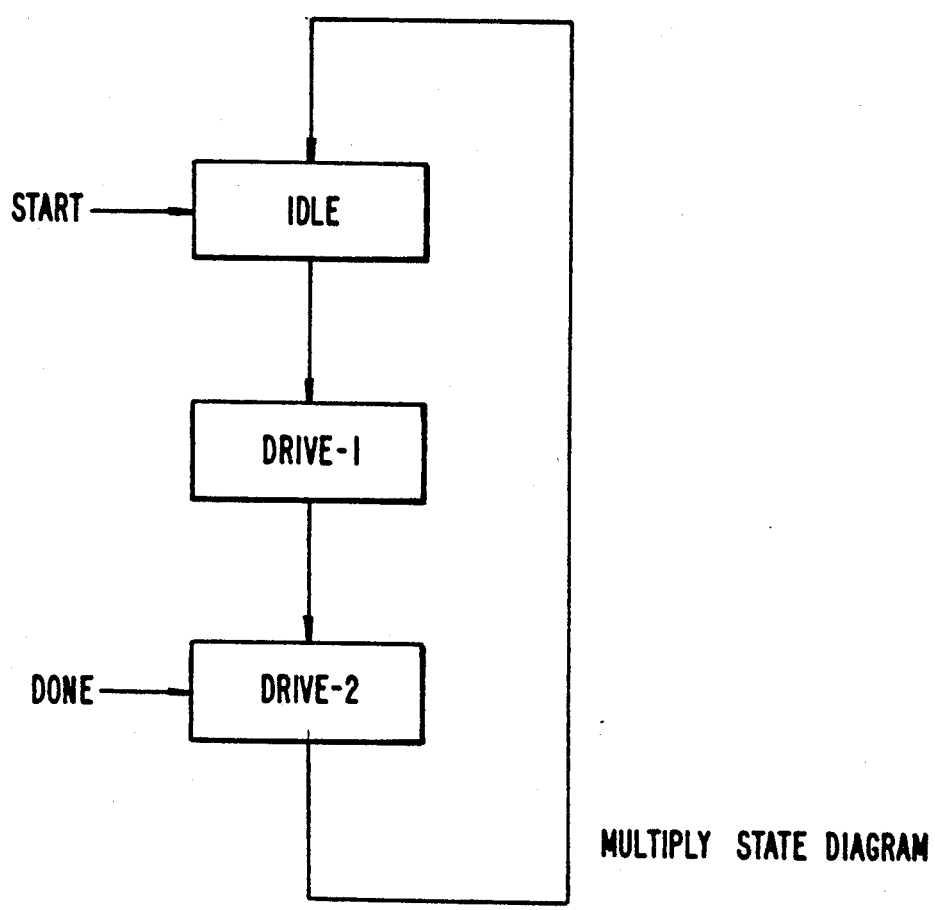
FIG._2.

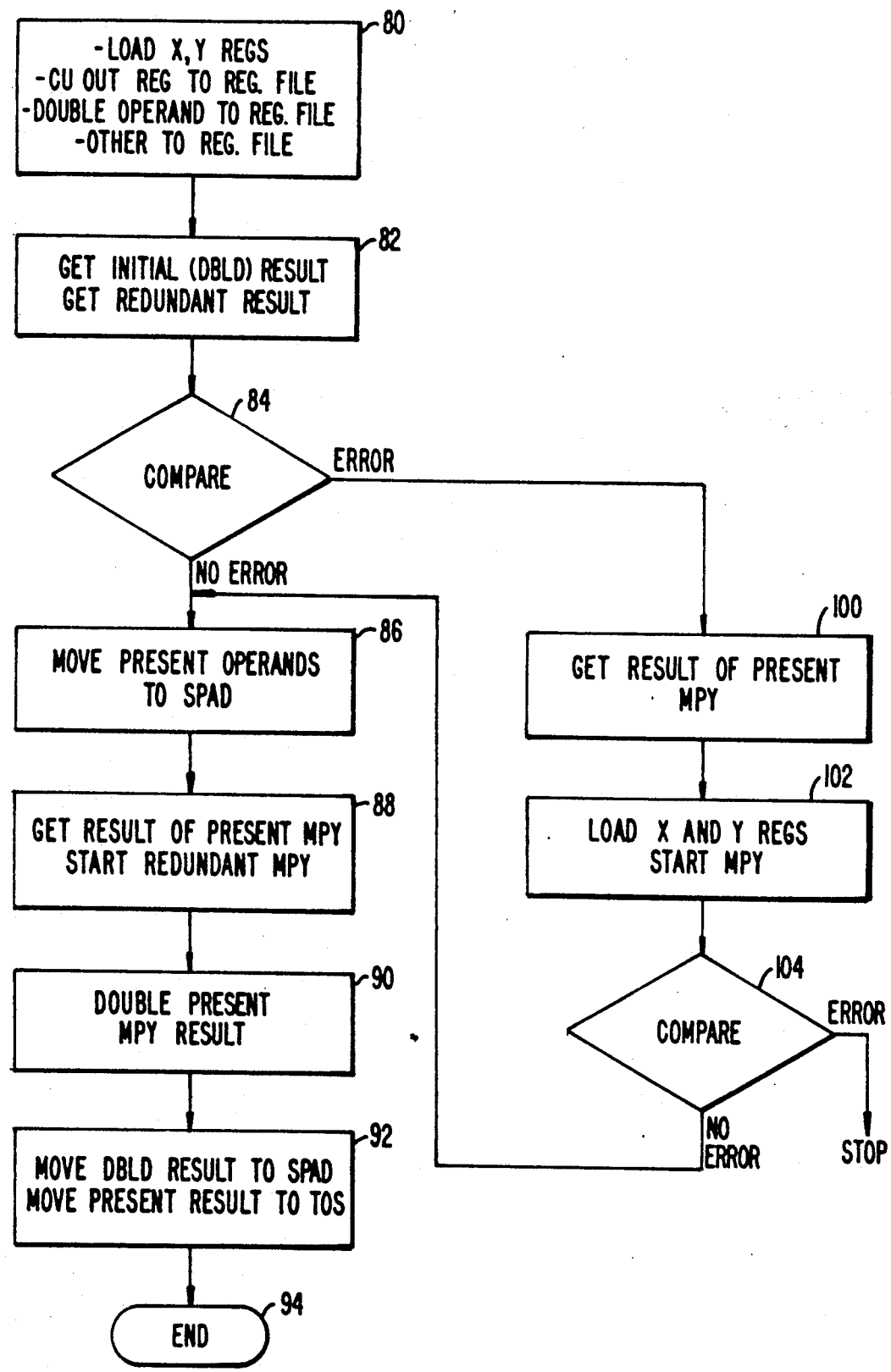
FIG._3.

DEFERRED COMPARISON MULTIPLIER CHECKER

BACKGROUND OF THE INVENTION

The present invention relates generally to data processing equipment, and more particularly to a method, and apparatus for implementing that method, of checking the result of each multiplier operation.

As today's data processing equipment finds its way into more critical uses, the need to check the integrity of various of the operations performed by the data processing equipment, including its computational operations, becomes important. Balancing this importance is a need to keep cost and circuit count low. Thus, there often is a conflict between the necessity of reliable error detection and expense.

A variety of error detection routines are available for the more simplistic arithmetic operations such as, for example, addition, subtraction and shifting. However, for the more complicated arithmetic operations, such as multiplication implemented by special purpose circuitry, the error detection methods can become complex necessitating large amounts of circuitry.

One approach to error detection of multiplication is found in an article by Janak H. Patel and Leona Y. Fung, entitled "Concurrent Error Detection in Multiply and Divide Arrays." IEEE Transactions on Computers, Vol. C-32, No. 4, April, 1983 (pps. 417-422). This article describes an error detection technique in which after the initial multiplication operation, one of the operands is shifted, and a redundant multiplication operation performed. The result of the initial multiplication operation is thus checked by comparing it with the result of the redundant multiplication operation. However, the technique leaves much to be desired: First, although the technique taught involves some data alteration before performing the redundant multiplication operation, it is believed that the particular alteration taught (shifting one operand) is not as complete as could be. In addition, the technique withholds use of the result of the initial multiplication operation until the check is complete. This withholding is costly in terms of CPU time for each multiplication operation.

Accordingly, it is apparent that error detection for multiplication operations can be improved.

SUMMARY OF THE INVENTION

According to the present invention there is provided a method, and apparatus for implementing that method, of checking multiplication operations later in time than heretofore known in the prior art.

Briefly, the method of the present invention involves performing an initial multiplication operation involving first and second operands, using an autonomous multiplier array. Then, the operands are altered by first swapping them, and shifting one of them one bit position, and the multiplication operation performed again. However, the check is not made until the next multiplier operation called for. Alternatively, if no subsequent multiplier instruction is encountered, and the result of the initial multiplier operation is to exit the processor, the data integrity check is made before allowing the initial result to propagate through the system.

A number of advantages flow from the present invention. First, by deferring the error checking, the initial result of the multiplier operation can be used immediately, so that each multiplier operation need not wait for the check to be performed. The error checking routine is performed in parallel with a subsequent multiplier operation, thereby saving time, and circuitry.

Further, the redundant multiply operation forms a result for the deferred check using permutated operands; here, the operands are swapped (i.e., each operand replaces the other), and one is shifted left (i.e., multiplied) one bit position. This performs a more complete check of the multiplier unit to ensure that a fault will produce different multiplication results. Swapping only may not detect certain faults internal to the multiplier unit, and shifting only can fail to detect faulty (e.g., stuck HIGH or LOW) input pins of the multiplier unit. Swapping the operands and shifting one of them left one bit position advantageously achieves a more complete multiplication check.

These, and other advantages and features of the present invention, will become evident to those skilled in the art upon a reading of the following detailed description of the invention, which should be taken in conjunction with the accompanying drawings.

DESCRIPTION OF THE DRAWINGS

FIG. 1 is a simplified block diagram schematic of a processor unit implementing the present invention;

FIG. 2 is a state diagram of the state machine that controls the multiplier of the processor shown in FIG. 1; and FIG. 3 is a flow chart illustrating the steps taken in the multiplier operation, including the error checking routine.

DETAILED DESCRIPTION

Referring first to FIG. 1, there is illustrated a processor unit, designated generally with the reference numeral 10, shown as including an instruction unit 12, a memory unit 14, a control unit 16, and a data unit 18. Data communication between the various units 12-18 of the processor 10 is established, in part, by an Bus 20, a multi-bit data/address bus of conventional fashion.

The instruction unit 12 is also of conventional design, and functions to sequentially access instructions from the memory unit 14, decode them, and communicate an initial microcode address for the sequencer 24 via signals 19.

The memory unit 14 holds both data and the instructions, and includes random access memory (RAM). Its architecture is also conventional and, therefore, is not discussed in further detail here. Synchronous operation of the elements (e.g., instruction unit 12) is accomplished with a periodic clock signal (CLK) generated by a clock circuit 22.

The control unit 16 is designed to include various control circuitry (not shown); including a sequencer 24. Sequencer 24 is responsible for generating the various control signals that operate the processor 10. Although, for reasons of clarity sequencer 24 is shown here as a single unit, those skilled in this art will readily recognize that sequencer 24 is the microcode engine of the processor; and that it will include a control store from which microcode instructions sequentially issue to form, with other qualifying signals (not shown) the control signals that guide, direct, and control operation of the processor 10. The signaling on signal lines 19 determine which of various microcode sequences will issue, which in turn, depends upon the instructions decoded by the instruction unit 12. The control unit (CU) 16 additionally includes the circuitry for performing multiply operations as well as assisting in divide operations (by multiplying a reciprocal of a divisor by a dividend). As further illustrated in FIG. 1, the control unit 16 includes X and Y registers 26, 28 which each receive data from the Bus 20 via signal lines 30. Data is loaded in the X, Y registers 26, 28 in response to appropriate load commands (not shown) that issue from the sequencer 24.

The data content of the X and Y registers are applied to respective operand inputs of a multiplier array 32, the output of which is coupled to a multiplier (MPX) 34. The multiplier array is formed from combinatorial logic of conventional design, such as that manufactured and distributed by Cypress Semiconductor, Inc., 3901 North First Street, San Jose Calif. 95134, and sold under the Part No. CY7C517.

The output of the multiplier array 32, is passed to a control unit (CU) bus register 36 by the MPX 34, where it is made available via the Bus 20 to the processor 10. Control of the MPX 34 and bus register 36 are effected by a multiplier state machine 40. The multiplier state machine is of conventional design, and its operation will be discussed further with respect to the state diagram shown in FIG. 2.

In addition to the multiplier unit itself, the control unit 16 includes other circuitry (not shown) used for various control and data processing purposes. However, only the multiplier circuitry is shown for reasons of clarity, and also because this other circuitry is not germane to the present invention. The CU output register 36, however, is used for the entire control unit 16, and, therefore, the necessity of multiplexing these various other units (identified as "OTHER" in FIG. 1) with the output of the multiplier array 32 by the MPX 34.

Continuing with FIG. 1, the data unit 18 is shown as including a register file 50, constructed from a plurality of register circuits in conventional fashion, and forming a high-speed, temporary storage for, among other things, the operands used in the multiplier operation. As FIG. 1 indicates, the register file 50 has two sections: One section is a number of software visible registers that, in the implementation of the present invention, forms a last-in-first-out (LIFO) stack of conventional design, although it should be evident to those skilled in this art that other storage arrangements can be used. A second portion forms a number of "scratch" registers, used for high-speed, temporary storage. The actual implementation of the register file 50 is as a multi-ported (both input and output) device. However, FIG. 1 illustrates the register file 50 in simplistic form, showing the data paths.

The outputs of the register file 50 are coupled to J and K registers 54, 55 via multiplexers 56 and 57, respectively, and through these registers to an arithmetic logic unit (ALU) 58. The output of the ALU 58 is coupled back to the input of the register file 50 by a multiplexer 52.

The ALU is also of conventional design, capable of performing such various logic functions as exclusive-ORing, shifting left or right, or merely passing the data unaltered, in addition to the usual add and subtract operations.

Additional storage is provided by the data unit 18 in the form of a scratch path (SPAD) memory 64, that receives data directly from a multiplexer 60 which selects between the outputs of the J and K registers 54, 55. The output of the SPAD 64 is, in turn, coupled to an input of each of the multiplexers 56, 57. Thus, data accessed from the SPAD 64 is communicated to the register file 50 via one or the other of the multiplexer-register combinations 56/54 or 57/55, the ALU 58 and multiplexer 52; conversely, data from the SPAD may be communicated to the Bus 20 via the multiplexer-register combinations 56/54, 57/55, and multiplexer 60. Data may be transferred from the register file 50 to the SPAD 64 by this latter data path.

Data path widths are as shown in FIG. 1. Thus, for example, the Bus 20 will carry 32 bits of parallel data, as will the signal lines 30 (control unit 16), and the lines of the data unit 18 from the multiplexer 60 to the Bus 20 and the SPAD 64, or the signal lines that communicate the Bus 20 to the multiplexer 52.

Generally, operation of the processor 10 proceeds as follows: Instructions are sequentially accessed from the memory unit 14 by the instruction unit 12, decoded, and resulting in issuance of various control signals (not shown) as indicated above. Thus, depending upon the instruction type, control signals (not shown) will be generated to select the source of the operands for the ALU 58 of the data unit 18 (e.g., the register file 50 or the SPAD 64), or, for that matter, the source of the X and Y registers 26, 28 (e.g., the register file 50, the SPAD 64, or either of the J, K registers 54, 55). As can be seen, there is a large amount of flexibility in what source is available for multiplier operands.

Although execution of a multiply instruction will be discussed in connection with the deferred comparison checking that is performed, it will be advantageous to describe its basic operation here. The execution of a multiplier instruction will cause the instruction unit 12 to issue appropriate control signals (not shown) that will effect transfer of the multiply operands from the register file 50 (more specifically, the LIFO stack 50a) to the X and Y registers 26, 28. The (16-bit) operands have been previously loaded so that they are at the top of the LIFO stack 50a. They are "popped" from the LIFO stack and respectively loaded in the J and K registers 54, 55, and transferred from there, in parallel (as a 32-bit piece of data) to the (16-bit) X and Y registers 26, 28 via the Bus and signal lines 30.

Essentially simultaneous with the loading of the X and Y registers, a control signal (not shown) initiates operation of the multiplier state machine, which then takes over control of the multiply operation to load the result ultimately produced by the multiplier array 32 in the CU output register 36. Under control of signals from the instruction unit 12, the result is transferred from the CU output register 36 to a one of the scratch registers 50b of the register file 50 (data unit 18) via the Bus 50 and the multiplexer 52.

At about the time the operands are transferred from the J and K registers 54, 56 to the X and Y registers 26, 28, they are also being transferred to certain ones of the scratch registers 50b. The content of the J-register 54 is altered, however, during this transfer: It is communicated through the ALU 58 in a manner that causes the operand to be shifted one bit left, in effect doubling the operand; the content of the K-register 55 is stored in a scratch register unaltered. The operands will be returned to the J and K registers 54, 56, for communication to the X and Y registers (for execution of a redundant multiply operation) in a manner that causes what was previously set in the J-register 54 to be set in the K-register 55, and vice versa, i.e., the operands are swapped.

When the initial multiply operation is complete, the content of the CU output register 36, the result of the initial multiply operation, is transferred to a scratch register 50b. Ultimately it will be pushed onto the top of the LIFO stack 50a, where it is made available to the processor 10. At the same time the contents of the J and K registers (i.e., the swapped and altered operands) are transferred to the X and Y registers, initiating the redundant multiply operation, and the instruction unit 12 proceeds to other tasks. The result of the redundant multiply operation ultimately is placed in the CU output register 36, where is resides until a data check is performed by comparing the original or initial result (which has been stored in the SPAD 64, shifted left one bit to compensate for the alteration of one of the operands) with the redundant result. That check is performed upon the first to occur of two actions: When a subsequent multiply (or divide) operation is initiated, or when the initial result of the multiply operation is to leave the processor 10 for other destinations. Most times it will be the former activity, and the check (as will be discussed further below) is performed in parallel with the initiation of the subsequent multiply operation. In this manner, by deferring the check and then performing it in parallel with another (multiply) operation, the time penalty is minimized, as is the circuitry necessarily needed to make the comparison.

The comparison itself is performed by transferring the redundant result from the CU output register 36 to one or the other of the J or K registers 54, 56, transferring the (shifted) initial result from the SPAD 64 to the other of the J or K registers, and logically exclusive-ORing them via the ALU 58. A ZERO detect circuit receives the output of the ALU 58 to check the result of the comparison, issuing an ERROR signal in the event the comparison indicates a faulty operation. The ERROR signal is communicated to the instruction unit 12 for handling in a manner that will be discussed more fully below.

Turning now to FIG. 2, there is illustrated the state diagram of the multiplier state machine 40, from which those skilled in the art will see indicates that the design of the multiplier state machine 40 itself is of a relatively simple design.

As indicated in FIG. 2, the multiplier state machine 40 resides first in an IDLE state. After the X and Y registers are loaded (preferably simultaneously therewith), the multiplier state machine 40 is caused to move from the IDLE state to a DRIVE_1 state, during which the content of the X and Y registers 26, 28 are applied to the multiplier array 32.

From the DRIVE_1 state, the multiplier state machine 40 moves to a DRIVE_2 state, during which a SEL signal is issued by the state machine 40 to cause the multiplier 34 to select the multiplier array 32 for communication to the CU output register 36. At approximately the same time, the multiplier state machine 40 will issue a load (LD) signal that causes the output of the multiplier array 32 to be loaded in the CU output register 36. Thereafter, the multiplier state machine 40 will return from the DRIVE_2 state to the IDLE state, where it will remain until the next multiply instruction.

Having now described the circuitry used to implement the present invention, and briefly discussing a multiply operation, the deferred comparison multiplier check can now be described in greater detail with respect to FIG. 3. For that discussion, assume that a previous multiplier operation had been performed, resulting in (1) an initial multiplier result and (2) a redundant result. The initial multiplier result is stored in the SPAD 64 (FIG. 1) of the data unit 18—shifted one bit. The redundant multiplier result is presumed to be presently contained in the control unit output register 36.

As FIG. 3 indicates, at step 80, the operands for the present multiply operation are transferred to the X and Y registers, and the multiply operation started. At the same time, one of the operands is communicated to a scratch register file 50b via the ALU 58, so that it is doubled (i.e., shifted left one bit); and the other operand is also stored in a scratch register 50b, unaltered.

At step 82, while the present multiply operation is in progress, the result of the previous multiply operation is checked as follows: The redundant multiplier result is transferred from the CU output register 36 to a scratch register 50b of the register file 50, and from there to one of the J or K registers 54, 56 of the data unit 18. At the same time, the (shifted) initial result is transferred from the SPAD 64 to the other of the J or K registers 54, 56. Then, at step 84, the contents of the two registers are exclusive-ORed with one another by the ALU 58, and the result monitored by the zero detect circuit 70, effecting the compare operation. If no error is detected, the output of the ALU 58 will be all ZEROs, and the ERROR signal is not asserted by the zero detect circuit. If an error is detected, another series of steps are taken to ensure that the error is a multiplication error, as will be described more fully below.

Assuming the compare step 84 detects no error, step 86 is proceeded to in which the operands of the present multiplication are moved from their scratch registers 50b to the SPAD 64 via the J and K registers 54, 55. In step 80, the result of the present multiply operation is moved from the CU output register 36 (where it has been loaded by the multiply operation) and stored in one of the scratch register files 50b. At the same time, the operands for the redundant multiply operation of the present multiply operation are transferred to the J and K registers, and from there to the X and Y registers to start a redundant multiply.

In step 90, the present multiply result is passed through the ALU 58 to double it (i.e., shift left one bit position) and stored back in a scratch register file 50b. In step 92, the doubled result is moved to the SPAD 64, and the present (unaltered) result is moved to the top of the register stack (TOS) of the LIFO 50a, where it is available for the processor 10. That completes the steps of the multiplier operation.

As indicated above, the CU output register 36 is available for use by other circuitry, delineated OTHER in FIG. 1 coupled to one of the inputs of the multiplexer 34. Thus, there is occasion when the data from such OTHER circuitry is loaded in the CU output register 36 before a check of a multiplier result can be made, destroying the content (i.e., the redundant result that sits in the CU output register 36 until the compare step 84 step can be made). Thus, step 84 will cause the zero detect circuit 70 to produce an error, and the step 84 most likely will be followed by a series of steps, under control of the instruction unit, to ensure that the redundant result is compared to the shifted initial result.

Digressing for a moment, there is, as those skilled in this art will recognize, a chance that in the circumstance described above, the CU output register 36 will be loaded with data by such OTHER circuitry which, coincidentally, may have a bit configuration identical to the initial (but possibly incorrect) multiplier result. In this case the multiply operation will go unchecked. However, as the skilled artisan will also readily recognize, the chance of this occurrence, coupled with the chance of multiplier error, is so small as to be infinitesimal—and an acceptable risk.

Thus, at step 100, the result of the present multiply is moved from the CU output register 36 and stored in a scratch register file 50b. Next, in step 102, the operands for the redundant multiply operation are moved from the scratch register file 50b to the X and Y registers 26, 28, to start the redundant multiply operation. The processor 10 waits until completion in order to ensure that the CU output register 36 will contain the redundant result. In step 104, the initial (doubled) result is moved from the SPAD 64 to one of the J, K registers 54, 55, while the redundant result is moved from the CU output register 36 to the other of the J, K, registers, and exclusive-ORed with one another via the ALU 58, as described above. This time, if the zero detect circuit determines an error, and the method of the present invention is used in a multi-processor (fault-tolerant) system, the processor 10 can preferably be halted, and a back-up processor (not shown) would take over the work of processor 10. Other procedures may well be taken in a single processor (or non-fault tolerant) system. If no error is detected, the procedure moves back to step 86 and progresses through steps 88, 90, 94 as described above.

A word about certain of the features of the invention: First, as has been seen, the multiplier operation is checked by creating a redundant result from swapped operand, one of which is shifted left (i.e., multiplied). A multiplication (shift left) of the one operand is preferred over a divide (shift right) to preserve the integrity of the shifted operand (i.e., bits are not lost shifting left, and any overflow can be handled specially).

Second, although the check is performed when a subsequent multiply instruction is executed, as noted above, there is another instance that will cause a check to be initiated. Since the initial result of the multiply operation is immediately available to the processor for use, and a subsequent check indicates that the result may be erroneous, it is relatively easy to back-up and make appropriate adjustments—as long as the use of the (unchecked) initial result remains within the confines of the processor 10. This back-up capability may be lost however, if the unchecked initial result is allowed to propagate beyond the processor 10. Thus, it is preferred that if the unchecked initial result is to be sent beyond the processor 10 (e.g., to secondary storage, another processor, or the like) before a subsequent multiply instruction causes initiation of a check, a multiplier check is initiated before the initial result is allowed to leave the processor. This is what is done. The steps of FIG. 3 are performed, as described above, except that no current multiply is performed; only the check is made.

Finally, there are various other methods of handling detection of an error in step 104 (FIG. 3) than halting operation of the processor 10, many depending upon the environment within which the present invention is used. For example, as known to those skilled in this art, more than one process can be running on the processor 10. Thus, it could happen that a current process has initiated a multiply operation, but before that multiply operation is checked (e.g., by a check initiated by a subsequent multiply or an operation that will send the initial result beyond the confines of the processor 10) the current process is momentarily swapped in favor of another process (or processes). In such an instance, it would be preferable to initiate a multiplier check before the process swap takes place.

Thus, the deferred multiplier checking method of the present invention is applicable to a wide variety of computing systems, even single processor systems. And, while a full and complete disclosure of the invention has been disclosed, it will be evident to those skilled in this art that modifications can be made without departing from its essence. For example, while permutation of the operands used in the redundant multiply operation involves swapping, and shifting one operand, other techniques are available. One such other technique may involve complementing one of the operands used in the redundant multiply operation, or shifting one operand left while the other operand is shifted right (if loss of resolution is not a problem). Thus, those skilled in the art will readily recognize that one may use a variety of combinations of the operand permutations heretofore discussed, i.e., swapping complementation and/or shifting (right or left).

What is claimed is:

1. In a data processing system including a processor unit of the type having an instruction unit operable to execute a plurality of instructions, and an autonomous arithmetic unit operable to receive multi-bit operands to perform arithmetic operations substantially in parallel with operation of the instruction unit and produce therefrom a result, a method of checking the result comprising the steps of:

providing at least first and second operands to the arithmetic unit;

the arithmetic unit performing a first arithmetic operation on the first and second operands to obtain therefrom a first arithmetic result;

temporarily retaining the first arithmetic result and, at the same time, making the first arithmetic result available to the processor unit;

providing again the first and second operands in swapped order so that the first operand takes the place of the second operand as a third operand, and the second operand takes the place of the first operand as a fourth operand;

the arithmetic unit performing a second arithmetic operation on the third and fourth operands to obtain therefrom a second arithmetic result;

holding the second arithmetic result until a next immediately successive arithmetic operation is requested while permitting use of the first arithmetic result by the instruction unit;

when the next immediately successive arithmetic operation is requested, comparing the first and second arithmetic results it one another for equality when the other arithmetic operation is requested; and issuing an error signal in the even the comparing step does not result in equality.

2. The data processing system of claim 1, including the steps of:

in response to appearance of the error signal, the arithmetic unit performing again the second arithmetic operation on the third and fourth operands to obtain therefrom another second arithmetic result;

again comparing the first and the another second arithmetic results to one another for equality;

halting operation of the processor in the event the again comparing step does not result in equality.

3. The data processing system of claim 1, wherein the second providing step includes shifting the third operand one bit position before the second arithmetic operation is performed; and the comparing step is immediately preceded by the step of shifting the second arithmetic result to compensate for the shifting of the third operand.

4. The data processing system of claim 3, wherein the step of shifting the third operand performs the shift in a manner that effects an arithmetic multiply operation.

5. The data processing system of claim 4, wherein the step of shifting the third operand is a one-bit position shift.

6. The data processing system of claim 1, including the step of halting operation of the processor unit upon issuance of the error signal.

7. In a data processing system of the type including at least one processor unit, the processor unit including a state machine-controlled multiplier unit for performing multiplication operations, a method of checking multiplication operations, comprising the steps of:

the multiplication unit performing a multiplication operation upon first and second operands to produce a first result that is immediately available to the processor unit for use;

initiating a multiplication operation upon the first and second operands to produce a second result;

holding the second result until another multiplication operation is requested, or the first result is to be used outside the processor unit, whichever occurs first;

comparing the first and second results; and halting the processor unit if the comparing step indicates the first result may not be correct.

8. A method of detecting errors in arithmetic operations performed by an autonomous arithmetic unit that forms a part of a controlling processor unit, the method comprising the steps of:

performing a first arithmetic operation to produce a first result that is then substantially immediately available to the processor unit for use;

performing a second arithmetic operation to produce a second result that can be used to check the operation of the arithmetic unit in a check operation incorporating the first result;

holding the second result until the first result is to leave the processor unit;

then, before the first result is permitted to leave the processor unit, checking the arithmetic unit, using the first and second results; and issuing an error signal in response to the checking step indicating that the first and second results do not compare.

* * * * *